US010436414B2

(12) United States Patent
Yokoyama et al.

(10) Patent No.: US 10,436,414 B2
(45) Date of Patent: Oct. 8, 2019

(54) VIEWING DEVICE FOR VEHICLE

(71) Applicant: KABUSHIKI KAISHA TOKAI-RIKA-DENKI-SEISAKUSHO, Aichi (JP)

(72) Inventors: Kazuyuki Yokoyama, Aichi (JP); Masatsugu Ohashi, Aichi (JP); Masahiro Arai, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 15/524,192

(22) PCT Filed: Nov. 6, 2015

(86) PCT No.: PCT/JP2015/081388
§ 371 (c)(1),
(2) Date: May 3, 2017

(87) PCT Pub. No.: WO2016/076238
PCT Pub. Date: May 19, 2016

(65) Prior Publication Data
US 2017/0334345 A1    Nov. 23, 2017

(30) Foreign Application Priority Data
Nov. 14, 2014   (JP) .................................. 2014-232002

(51) Int. Cl.
*F21V 9/00*       (2018.01)
*F21S 43/31*      (2018.01)
(Continued)

(52) U.S. Cl.
CPC ............ *F21S 43/31* (2018.01); *B60Q 1/0052* (2013.01); *B60Q 1/2665* (2013.01);
(Continued)

(58) Field of Classification Search
CPC .......... F21S 43/14; F21S 43/145; F21S 43/16; B60Q 1/2661; B60Q 1/2665
See application file for complete search history.

(56) References Cited

U.S. PATENT DOCUMENTS

| 5,497,306 A | 3/1996 | Pastrick |
| 6,176,602 B1 * | 1/2001 | Pastrick ............... B60Q 1/2665 362/494 |

(Continued)

FOREIGN PATENT DOCUMENTS

| CN | 202382141 U | 8/2012 |
| EP | 1243467 A2 | 9/2002 |

(Continued)

OTHER PUBLICATIONS

International Search Report issued in a corresponding application PCT/JP2015/081388 dated Feb. 9, 2016.
(Continued)

*Primary Examiner* — Matthew J. Peerce
(74) *Attorney, Agent, or Firm* — Roberts Mlotkowski Safran Cole & Calderon, P.C.

(57) ABSTRACT

In a door mirror device for a vehicle, a projector protrudes out toward a lower side from a circuit board, and the projector projects a pattern onto a ground surface. Moreover, illuminating LEDs and guide bodies are fixed to a lower surface of the circuit board. Due to the illuminating LEDs generating lights and the guide bodies guiding these lights, the guide bodies irradiate the lights from lower ends, and the ground surface is illuminated. Here, the lower ends of the guide bodies are disposed further toward a lower side than the projector. Therefore, shadows, which are due to the projector, arising in lights that illuminate the ground surface can be suppressed.

7 Claims, 3 Drawing Sheets

(51) Int. Cl.
*F21S 43/20* (2018.01)
*F21S 43/40* (2018.01)
*F21S 43/14* (2018.01)
*F21S 43/19* (2018.01)
*B60Q 1/26* (2006.01)
*B60R 1/12* (2006.01)
*F21V 5/04* (2006.01)
*F21V 19/00* (2006.01)
*F21V 8/00* (2006.01)
*B60Q 1/00* (2006.01)
*F21S 43/237* (2018.01)
*F21S 43/243* (2018.01)
*F21S 43/247* (2018.01)
*F21Y 115/10* (2016.01)

(52) U.S. Cl.
CPC ............ *B60R 1/1207* (2013.01); *F21S 43/14* (2018.01); *F21S 43/19* (2018.01); *F21S 43/237* (2018.01); *F21S 43/243* (2018.01); *F21S 43/247* (2018.01); *F21S 43/255* (2018.01); *F21S 43/26* (2018.01); *F21S 43/40* (2018.01); *F21V 5/04* (2013.01); *F21V 19/0015* (2013.01); *G02B 6/0001* (2013.01); *B60Q 2400/40* (2013.01); *B60Q 2400/50* (2013.01); *F21Y 2115/10* (2016.08)

(56) References Cited

U.S. PATENT DOCUMENTS

| | | | |
|---|---|---|---|
| 6,250,784 B1 * | 6/2001 | Kayama | B60Q 1/2665 362/135 |
| 6,502,970 B1 * | 1/2003 | Anderson | B60Q 1/2665 362/492 |
| 6,986,596 B2 * | 1/2006 | Evans | B60Q 1/2665 359/850 |
| 7,175,321 B1 | 2/2007 | Lopez | |
| 2005/0094405 A1 * | 5/2005 | Tatewaki | B60Q 1/2696 362/341 |
| 2009/0115631 A1 | 5/2009 | Foote et al. | |
| 2009/0161379 A1 | 6/2009 | Liesener | |
| 2012/0200476 A1 | 8/2012 | Kanamori et al. | |
| 2013/0130674 A1 | 5/2013 | De Wind et al. | |

FOREIGN PATENT DOCUMENTS

| | | |
|---|---|---|
| JP | 01-195154 A | 8/1989 |
| KR | 0130101734 A | 9/2013 |
| WO | 0015462 A1 | 3/2000 |
| WO | 2008137634 A1 | 11/2008 |

OTHER PUBLICATIONS

Extended European Seacrh Report issued in corresponding European Application No. 15859460.6 dated Nov. 6, , 2018.

* cited by examiner

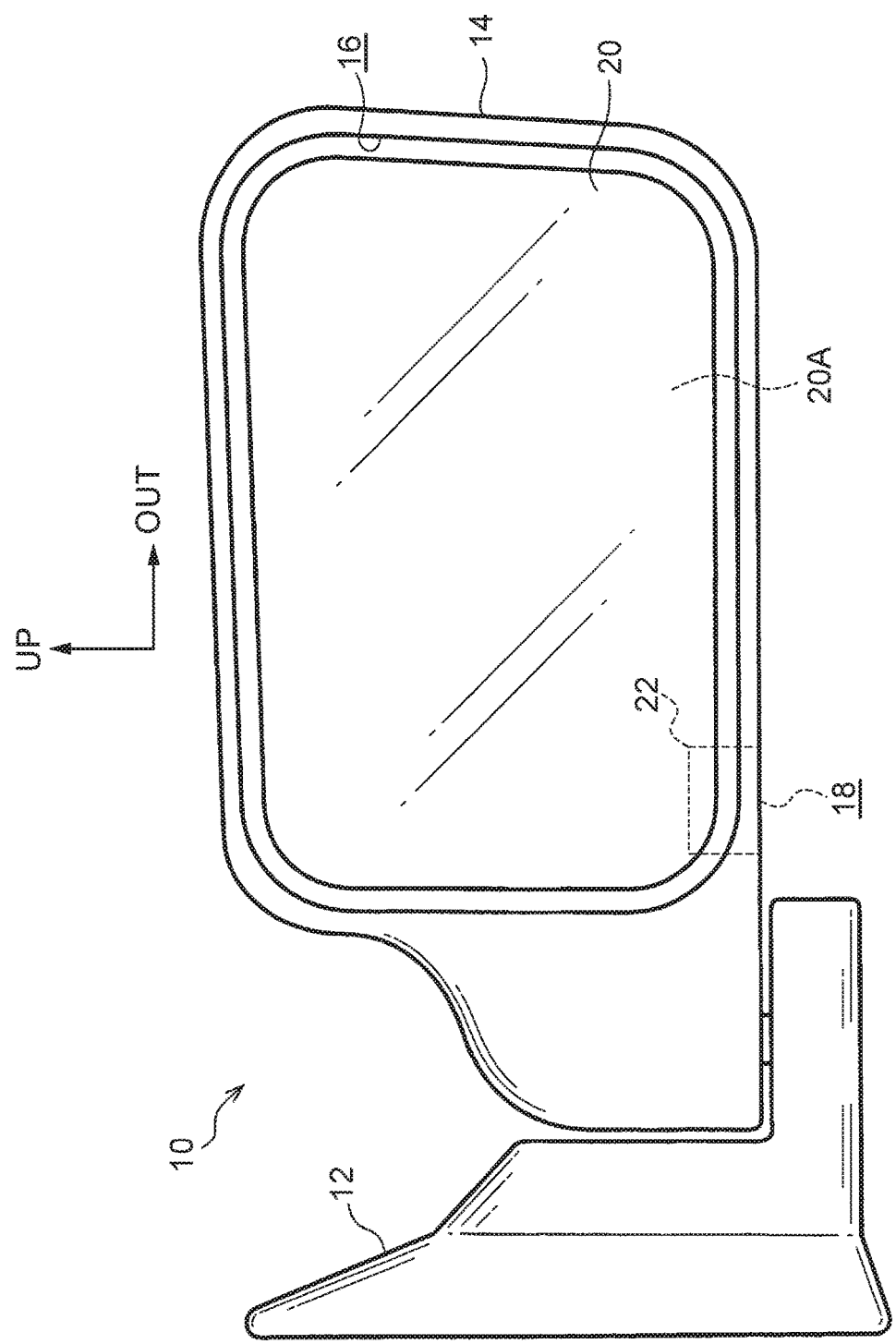

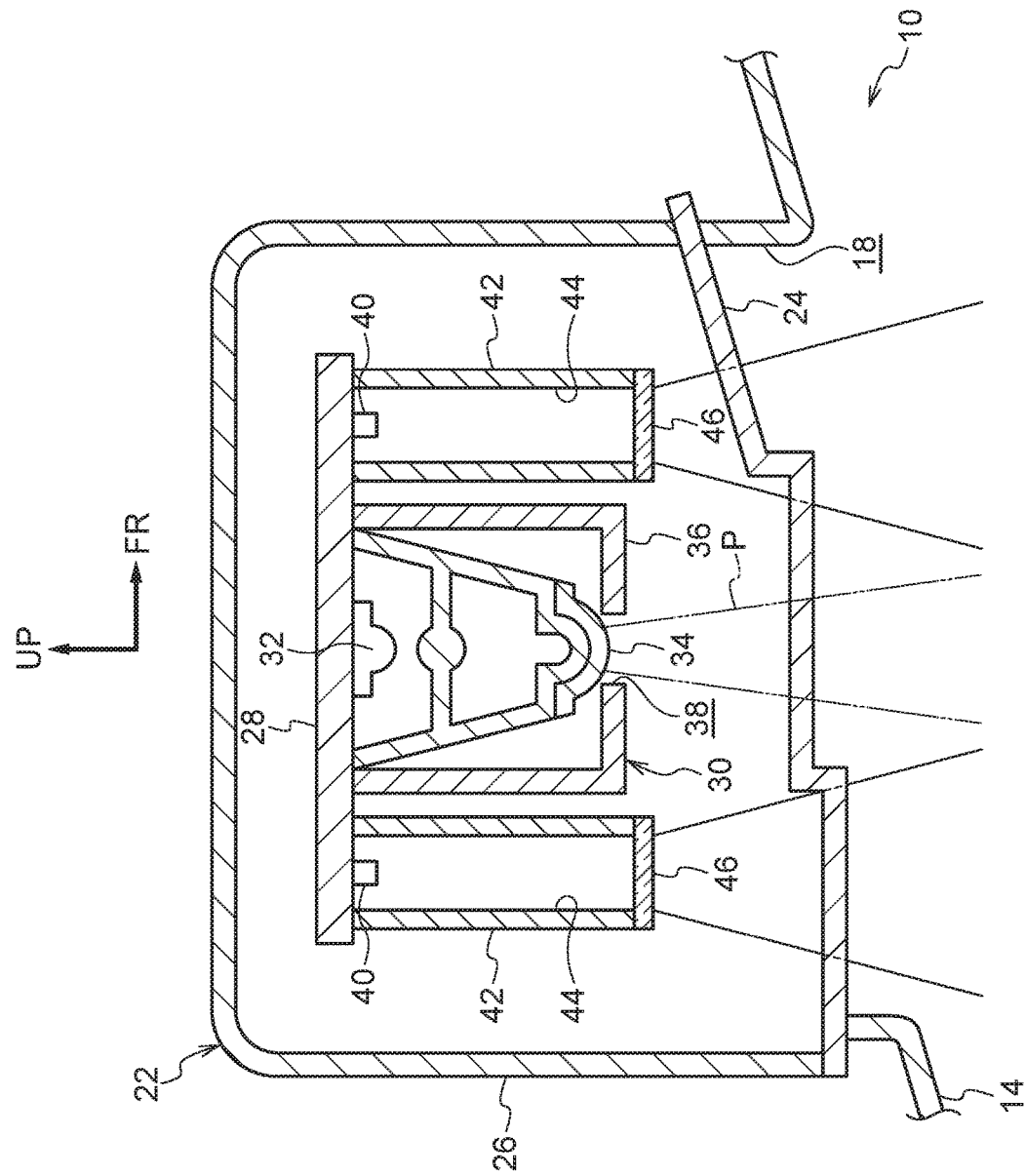

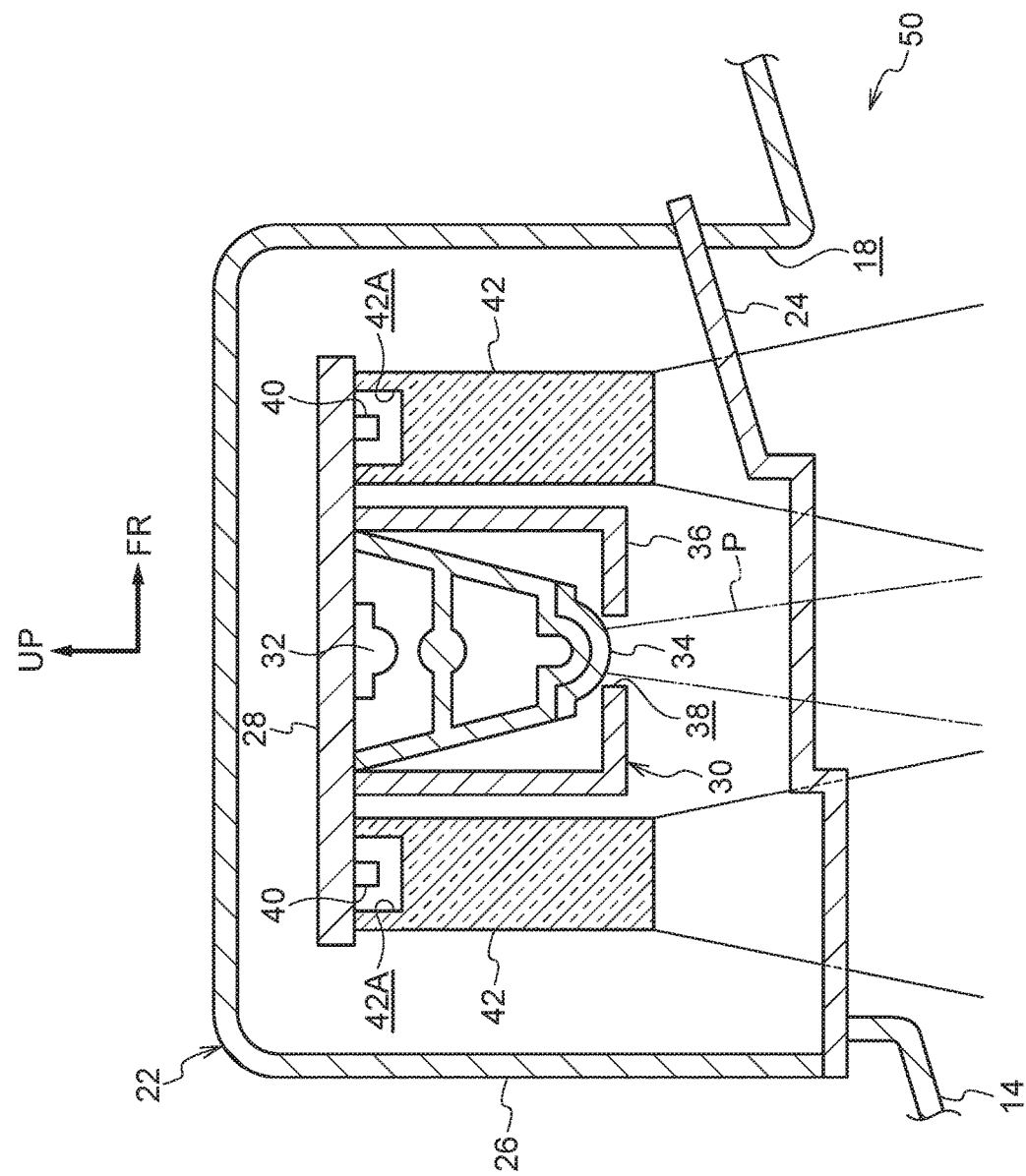

VIEWING DEVICE FOR VEHICLE

CROSS-REFERENCE TO RELATED APPLICATIONS

The present application is a U.S. National Phase of PCT/JP2015/081388 filed on Nov. 6, 2015 claiming priority to Japanese Patent application No. 2014-232002 filed Nov. 14, 2014. The disclosure of the PCT Application is hereby incorporated by reference into the present Application.

TECHNICAL FIELD

The present invention relates to a viewing device for a vehicle in which a viewing means assists viewing by a vehicle occupant of a vehicle.

BACKGROUND ART

In the illumination module described in U.S. Patent Application Publication No. 2013/0130674, a circuit element is supported at a housing, and a projecting LED and a ground surface illuminating LED are provided at the circuit element. Moreover, the projecting LED is accommodated in a lens holding portion of a housing, and the lens holding portion projects out toward the outer side of the housing.

Here, in such an illumination module, it is preferable to be able to suppress shadows, which are due to the lens holding portion, arising in the light that is emitted from the ground surface illuminating LED.

SUMMARY OF INVENTION

Technical Problem

In view of the above-described circumstances, an object of the present invention is to obtain a viewing device for a vehicle that can suppress shadows, which are due to a projecting means, arising in light that is emitted from an emitting means.

Solution to Problem

A viewing device for a vehicle of a first aspect of the present invention comprises: viewing means for assisting viewing by a vehicle occupant of a vehicle; an accommodating body in which the viewing means is accommodated; projecting means that is provided at an interior of the accommodating body, that protrudes out toward an outer side of the accommodating body, and that projects images; emitting means that is provided at the interior of the accommodating body and emits light; and guiding means at which an exit portion is provided, and that guides light, which the emitting means has emitted, and that emits the light from the exit portion toward the outer side of the accommodating body, the exit portion being disposed at a protruding distal end position of the projecting means or further toward the outer side of the accommodating body than the projecting means, in an emitting direction of light from the exit portion.

In a viewing device for a vehicle of a second aspect of the present invention, in the viewing device for a vehicle of the first aspect of the present invention, the guiding means is disposed at an outer side of a projection range of images from the projecting means.

In a viewing device for a vehicle of a third aspect of the present invention, the viewing device for a vehicle of the first aspect or the second aspect of the present invention comprises diffusing means for diffusing light that is emitted from the exit portion.

Advantageous Effects of Invention

In the viewing device for a vehicle of the first aspect of the present invention, the viewing means is accommodated in the accommodating body, and the viewing means assists viewing by the vehicle occupant of the vehicle. Further, the projecting means is provided within the accommodating body. The projecting means protrudes out toward the outer side of the accommodating body, and projects images. Moreover, the emitting means is provided within the accommodating body, and the emitting means emits light. Moreover, the exit portion is provided at the guiding means, and the guiding means guides the light, which the emitting means has emitted, and emits the light from the exit portion toward the outer side of the accommodating body.

Here, the exit portion of the guiding means is disposed at the protruding distal end position of the projecting means or further toward the outer side of the accommodating body than the projecting means, in the emitting direction of light from the exit portion. Therefore, shadows, which are due to the projecting means, arising in the light that is emitted from the emitting means can be suppressed.

In the viewing device for a vehicle of the second aspect of the present invention, the guiding means is disposed at the outer side of the projection range of images from the projecting means. Therefore, shadows, which are due to the guiding means, arising in the images projected from the projecting means can be suppressed.

In the viewing device for a vehicle of the third aspect of the present invention, the diffusing means diffuses light that is emitted from the exit portion of the guiding means. Therefore, the range of emitting of light from the exit portion can be enlarged.

BRIEF DESCRIPTION OF DRAWINGS

FIG. 1 is an elevation that is seen from a vehicle rear side and shows a door mirror device for a vehicle relating to a first embodiment of the present invention.

FIG. 2 is a cross-sectional view that is seen from a vehicle transverse direction outer side and shows an illuminating device at the door mirror device for a vehicle relating to the first embodiment of the present invention.

FIG. 3 is a cross-sectional view that is seen from a vehicle transverse direction outer side and shows an illuminating device at a door mirror device for a vehicle relating to a second embodiment of the present invention.

DESCRIPTION OF EMBODIMENTS

First Embodiment

A door mirror device 10 for a vehicle, which serves as a viewing device for a vehicle relating to a first embodiment of the present invention, is shown in FIG. 1 in an elevation seen from a vehicle rear side. Note that, in the drawings, the vehicle front is indicated by arrow FR, a vehicle transverse direction outer side (the vehicle right side) is indicated by arrow OUT, and the upper side is indicated by arrow UP.

The door mirror device 10 for a vehicle relating to the present embodiment is provided at a vertical direction intermediate portion and a vehicle front side end of a side door (in particular, a front side door) that serves as a door of the vehicle, and is disposed at the vehicle outer side.

As shown in FIG. 1, the door mirror device 10 for a vehicle has a stay 12 that serves as an installation member. The door mirror device 10 for a vehicle is installed at the side door due to the vehicle transverse direction inner side end of the stay 12 being fixed to the side door (the vehicle body side).

A visor 14, which is shaped as a substantially parallelepiped container and serves as an accommodating body, is supported at the vehicle transverse direction outer side portion of the stay 12. The visor 14 is disposed at the vehicle transverse direction outer side of the stay 12. An opening 16 that is substantially rectangular is formed so as to pass-through the vehicle rear side wall of the visor 14, and the opening 16 opens the visor 14 interior to the vehicle rear side. A through-hole 18 that is substantially circular is formed so as to pass-through the bottom wall of the visor 14, and the through-hole 18 opens the visor 14 interior to the lower side.

A mirror 20, which is substantially rectangular plate-shaped and serves as a viewing means, is disposed within the visor 14 in a vicinity of the opening 16. The mirror 20 is supported by the stay 12, and the entire periphery and the vehicle front side surface of the mirror 20 are covered by the visor 14. A mirror surface 20A of the mirror 20 is directed toward the vehicle rear side. Due thereto, the mirror 20 makes it possible for a vehicle occupant (the driver in particular) of the vehicle to view the vehicle rear side, and assists viewing by the vehicle occupant.

An illuminating device 22 is accommodated within the visor 14 at the upper side of the through-hole 18.

As shown in FIG. 2, an outer lens 24, which is disc-shaped and serves as an outer member, is provided at the lower end of the illuminating device 22. The outer lens 24 is transparent, and light can be transmitted therethrough. The outer lens 24 is fixed to the periphery of the through-hole 18 of the visor 14, and the outer lens 24 closes-off the through-hole 18.

A housing 26, which is shaped as a substantially cylindrical container and serves as an accommodating member, is provided at the illuminating device 22. The lower surface of the housing 26 is open. The outer lens 24 is fixed to the lower side of the housing 26, and the outer lens 24 closes-off the lower surface opening of the housing 26.

A circuit board 28, which is disc-shaped and serves as a placement member, is provided at the upper portion of the housing 26 interior. The circular board 28 is disposed perpendicular to the vertical direction.

A projector 30 that serves as a projecting means is fixed to the lower side of the central side portion of the circuit board 28. The projector 30 protrudes out from the circuit board 28 toward the lower side (the outer side of the visor 14 and the outer side of the housing 26).

A projector LED 32 that serves as a light emitting means is provided at the projector 30. The projector LED 32 is fixed to the bottom surface of the central portion of the circuit board 28. The projector LED 32 is electrically connected to the circuit board 28, and the projector LED 32 can generate light (can emit (irradiate) light) on a first occasion.

A lens unit 34, which is shaped as a substantially upside-down, truncated conical container, is provided at the projector 30. The top surface of the lens unit 34 is open. The lens unit 34 is fixed coaxially to the lower surface of the circuit board 28, and the projector LED 32 is accommodated coaxially in the upper end of the lens unit 34 interior. The lens unit 34 is transparent. The lens unit 34 passes and transmits, through the lower side thereof, the light generated by the projector LED 32, and irradiates (illuminates) the light from the lower end toward the lower side and in the shape of a cone that is coaxial.

A patterned film (not illustrated), which is shaped as a sheet and serves as an image member, is provided within the lens unit 34. A pattern (not shown) that serves as an image is provided at the patterned film. Light can be transmitted-through the patterned film. The light, which passes-through the lens unit 34 toward the lower side, is transmitted-through the patterned film.

A case 36, which is shaped as a substantially cylindrical container and serves as a protruding member, is provided at the projector 30. The upper surface of the case 36 is open. The case 36 is fixed coaxially to the lower surface of the circuit board 28. The lens unit 34 is accommodated coaxially within the case 36. Light cannot be transmitted through the case 36. A projecting hole 38, which is circular and serves as a projecting portion, is formed so as to coaxially pass-through the lower wall of the case 36. Therefore, the light, which is irradiated toward the lower side from the lower end of the lens unit 34, passes-through the projecting hole 38 and is transmitted-through the outer lens 24, and due thereto, this light reaches the ground surface, and the pattern of the patterned film is projected (cast) onto the ground surface. Note that the irradiation range of light (the projection range of the pattern) by the projector 30 is denoted by reference letter P in FIG. 2.

A predetermined number (two in the present embodiment) of illuminating LEDs 40 that serve as emitting means are fixed to the lower surface of the outer peripheral portion of the circuit board 28, at the radial direction outer side of the projector 30. The illuminating LEDs 40 are disposed at uniform intervals in the peripheral direction of the circuit board 28. The illuminating LEDs 40 are electrically connected to the circuit board 28, and the illuminating LEDs 40 can generate light (can emit (irradiate) light) on a second occasion.

A predetermined number (two in the present embodiment) of guide bodies 42 that are cylindrical and serve as guiding means are fixed to the lower surface of the outer peripheral portion of the circuit board 28. The axial directions of the guide bodies 42 are disposed parallel to the vertical direction. The illuminating LEDs 40 are accommodated coaxially at the upper ends of the guide body 42 interiors, and the lower ends (the exit portions) of the guide bodies 42 are disposed at the lower side of the lower surface of the case 36 of the projector 30, and are disposed at the outer side of the irradiation range P of light by the projector 30. The guide bodies 42 are non-transparent. The guide bodies 42 guide (pass-through) the lights, which are generated by the illuminating LEDs 40, to the lower side at the interiors (the hollow portions) of the guide bodies 42, and irradiate (emit, illuminate) the lights in coaxial, conical shapes from the lower ends toward the lower side. Therefore, the lights that are irradiated from the lower ends of the guide bodies 42 toward the lower side are transmitted-through the outer lens 24 and reach the ground surface, and the ground surface (the feet of the vehicle occupant) is thereby illuminated.

Reflecting films 44 that serve as reflecting means are fixed to the entire inner peripheral surfaces of the guide bodies 42. The reflecting films 44 effectively reflect the lights that are within the guide bodies 42, and effectively guide the lights, which are generated by the illuminating LEDs 40, toward the lower side.

Diffusing films 46, which are shaped as circular sheets and serve as diffusing means, are fixed to the lower surfaces of the guide bodies 42. The diffusing films 46 cover the lower surface openings of the guide bodies 42. The diffusing films 46 are transparent. Due to the lights, which are irradiated from the lower ends of the guide bodies 42 toward the lower side, being transmitted through the diffusing films 46, the diffusing films 46 diffuse these lights, and enlarge the irradiation angles of these lights.

Operation of the present embodiment is described next.

In the door mirror device 10 for a vehicle of the above-described structure, within the housing 26 of the illuminating device 22, the projector 30 protrudes out toward the lower side from the circuit board 28, and the projector 30 projects the pattern onto the ground surface. Moreover, the illuminating LEDs 40 and the guide bodies 42 are fixed to the lower surface of the circuit board 28. The illuminating LEDs 40 generate light, and the guide bodies 42, at the interiors thereof, guide these lights toward the lower side. Due thereto, the guide bodies 42 irradiate these lights from the lower ends toward the lower side, and the ground surface is illuminated.

Here, the lower ends of the guide bodies 42 are disposed further toward the lower side than the projector 30 (the lower surface of the case 36) in the irradiating direction of light (the vertical direction which is the irradiating axial direction). Therefore, even in a case in which the illuminating LEDs 40 are disposed further toward the upper side than the projector 30 (the lower surface of the case 36), the advance of the lights, which are irradiated from the lower ends of the guide bodies 42, being limited by the projector 30 (the case 36) can be suppressed, and shadows, which are due to the projector 30 (the case 36), arising in the lights that illuminate the ground surface can be suppressed, and the appearance of the light that illuminates the ground surface can be improved. Moreover, even in a case in which the illuminating LEDs 40 are set adjacent to the projector 30 in the horizontal direction, shadows, which are due to the projector 30, arising in the lights that illuminate the ground surface can be suppressed. Therefore, the horizontal direction dimensions of the circuit board 28 and the housing 26 can be made to be small, the illuminating device 22 can be made to be compact, and the cost of the illuminating device 22 can be reduced.

Moreover, the diffusing films 46 are fixed to the lower surfaces of the guide bodies 42, and the diffusing films 46 diffuse the lights that are irradiated from the lower ends of the guide bodies 42. Therefore, the irradiation ranges of the lights that are irradiated from the lower ends of the guide bodies 42 can be enlarged, and the range over which the ground surface is illuminated can be enlarged.

Further, the guide bodies 42 are disposed at the outer side of the irradiation range P of light by the projector 30. Therefore, even in a case in which the lower ends of the guide bodies 42 are disposed further toward the lower side than the projector 30 (the lower surface of the case 36), the advance of the light that is irradiated from the projector 30 being limited by the guide bodies 42 can be suppressed, and shadows, which are due to the guide bodies 42, arising in the pattern that is projected onto the ground surface can be suppressed, and the appearance of the pattern that is projected onto the ground surface can be improved.

Note that, in the present embodiment, the reflecting films 44 are fixed to the inner peripheral surfaces of the guide bodies 42. However, the reflecting films 44 do not have to be fixed to the inner peripheral surfaces of the guide bodies 42.

Moreover, in the present embodiment, the diffusing films 46 are fixed to the lower surfaces of the guide bodies 42. However, the diffusing films 46 do not have to be fixed to the lower surfaces of the guide bodies 42.

Second Embodiment

The illuminating device 22 of a door mirror device 50 for a vehicle, which serves as a viewing device for a vehicle relating to a second embodiment of the present invention, is shown in FIG. 3 in a cross-sectional view seen from a vehicle transverse direction outer side.

The door mirror device 50 for a vehicle relating to the present embodiment is a structure similar to the above-described first embodiment, but differs with regard to the following points.

In the door mirror device 50 for a vehicle relating to the present embodiment, at the illuminating device 22, the guide bodies 42 are made to be light guides that are substantially cylindrical. Concave portions 42A, which are cylindrical and serve as accommodating portions, are formed coaxially in the top surfaces of the guide bodies 42. The illuminating LEDs 40 are accommodated coaxially in the upper ends of the concave portion 42A interiors. The guide bodies 42 are transparent. The guide bodies 42 guide (transmit-through) the interiors (the solid portions) thereof the lights that are generated by the illuminating LEDs 40, and irradiate (emit, illuminate) the lights in coaxial, conical forms toward the lower side from the lower ends (the exit portions). Therefore, the ground surface (the feet of the vehicle occupant) is illuminated due to the lights, which are irradiated toward the lower side from the lower ends of the guide bodies 42, being transmitted through the outer lens 24 and reaching the ground surface.

Embossment (not illustrated) that serves as a diffusing means is formed at the lower surfaces of the guide bodies 42. Minute convex and concave portions are formed by the embossment at the lower surfaces of the guide bodies 42. Due to the lights, which are irradiated from the lower ends of the guide bodies 42 toward the lower side, being transmitted through the embossment, the embossment diffuses the lights, and enlarges the irradiation angles of the lights.

Here, in the present embodiment as well, operation and effects that are similar to those of the above-described first embodiment can be achieved.

Note that, in the present embodiment, embossment is formed at the lower surfaces of the guide bodies 42. However, embossment does not have to be formed at the lower surfaces of the guide bodies 42.

Further, in the above-described first embodiment and second embodiment, the lower ends of the guide bodies 42 are disposed further toward the lower side than the projector 30 (the lower surface of the case 36), in the irradiating direction of the light (the vertical direction that is the irradiating axial direction). However, it suffices for the projector 30 (the case 36) to be disposed at the outer sides of the irradiation ranges of the lights from the lower ends of the guide bodies 42, and, for example, the lower ends of the guide bodies 42 may be disposed at the protruding distal end position of the projector 30 (the lower surface of the case 36) in the irradiating direction of the light (the vertical direction that is the irradiating axial direction).

Moreover, in the above-described first embodiment and second embodiment, the case 36 of the projector 30 and the guide bodies 42 are made to be separate bodies. However, the case 36 of the projector 30 and the guide bodies 42 may be made to be integral.

Further, in the above-described first embodiment and second embodiment, the viewing device for a vehicle of the present invention is made to be the door mirror device 10, 50 for a vehicle. However, the viewing device for a vehicle of the present invention may be made to be another mirror device for a vehicle (another outer mirror device for a vehicle at the vehicle exterior (e.g., a fender mirror device for a vehicle) or an inner mirror device for a vehicle at the vehicle interior), or a camera device for a vehicle (a device that assists viewing by the vehicle occupant by picking-up images), or the like.

The disclosure of Japanese Patent Application No. 2014-232002 that was filed on Nov. 14, 2014 is, in its entirety, incorporated by reference into the present specification.

EXPLANATION OF REFERENCE NUMERALS

10 door mirror device for vehicle (viewing device for vehicle)
14 visor (accommodating body)
20 mirror (viewing means)
30 projector (projecting means)
40 illuminating LED (emitting means)
42 guide body (guiding means)
46 diffusing film (diffusing means)
50 door mirror device for vehicle (viewing device for vehicle)
P irradiation range (projection range)

The invention claimed is:

1. A viewing device for a vehicle, comprising:
a viewing mechanism that assists viewing by a vehicle occupant of the vehicle;
an accommodating body in which the viewing mechanism is accommodated;
a projector that is provided at an interior of the accommodating body including a light emitter which emits light and that projects images provided at an image member by light which the light emitter has emitted, and an opaque, protruding member that protrudes out toward an outer side of the accommodating body and that envelopes the light emitter and includes a light-conducting opening at a distal end;
a second emitter that is provided at the interior of the accommodating body, that emits light, and that is different from the light emitter; and
a guide at which an exit portion is provided, and that guides light, which the second emitter has emitted, and that emits the light from the exit portion toward the outer side of the accommodating body, an entirety of the exit portion being disposed at the distal end of the protruding member or further toward the outer side of the accommodating body than the projector, in an emitting direction of light from the exit portion wherein the light emitter, the second emitter, and the projector are all attached to a same circuit board.

2. The viewing device for a vehicle of claim 1, wherein the guide is disposed at an outer side of a projection range of images from the projector.

3. The viewing device for a vehicle of claim 1, comprising a diffuser that diffuses light that is emitted from the exit portion.

4. The viewing device for a vehicle of claim 1, wherein the projector includes an exit portion that guides light that is separate from the exit portion of the guide.

5. The viewing device for a vehicle of claim 1, further comprising a third emitter that is provided at the interior of the accommodating body and that emits light,
wherein the second emitter and the third emitter are located on opposite sides of the light emitter.

6. The viewing device for a vehicle of claim 5, further comprising a second guide at which an exit portion is provided, and that guides light, which the third emitter has emitted, and that emits the light from the exit portion of the second guide toward the outer side of the accommodating body,
wherein the exit portion of the guide is disposed further toward the outer side of the accommodating body than the projector, in an emitting direction of light from the exit portion of the guide, and
the exit portion of the second guide is disposed further toward the outer side of the accommodating body than the projector, in an emitting direction of light from the exit portion of the second guide.

7. The viewing device for a vehicle of claim 1, further comprising a camera.

* * * * *